(12) United States Patent
Ziv et al.

(10) Patent No.: US 12,284,615 B2
(45) Date of Patent: Apr. 22, 2025

(54) SYNCHRONIZING COMMUNICATION IN A BACKHAUL NETWORK

(71) Applicant: Juganu Ltd., Or-Yehuda (IL)

(72) Inventors: Pinchas Ziv, Tel-Aviv (IL); Alexander Bilchinsky, Ganey-Tikva (IL); Dani Fichman, Raanana (IL); Gal Zuckerman, Holon (IL); Mark Altshuller, Ganot Hadar (IL)

(73) Assignee: Juganu Ltd., Or-Yehuda (IL)

( * ) Notice: Subject to any disclaimer, the term of this patent is extended or adjusted under 35 U.S.C. 154(b) by 0 days.

(21) Appl. No.: 18/171,819

(22) Filed: Feb. 21, 2023

(65) Prior Publication Data

US 2023/0247569 A1    Aug. 3, 2023

Related U.S. Application Data

(63) Continuation-in-part of application No. 17/649,408, filed on Jan. 31, 2022, now Pat. No. 11,652,514.

(60) Provisional application No. 63/312,530, filed on Feb. 22, 2022.

(51) Int. Cl.
*H04W 56/00*    (2009.01)

(52) U.S. Cl.
CPC .................................. *H04W 56/00* (2013.01)

(58) Field of Classification Search
CPC .................................................... H04W 56/00
See application file for complete search history.

(56) References Cited

U.S. PATENT DOCUMENTS

2009/0316763 A1    12/2009    Erkip et al.
2021/0105867 A1*   4/2021     Akkarakaran ........ H04W 88/14

* cited by examiner

*Primary Examiner* — Rahel Guarino
(74) *Attorney, Agent, or Firm* — Intrinsic Law Corp.

(57) ABSTRACT

A backhaul system operative to: increase network capacity, prevent unwanted re-transmissions, and facilitate multiple hopes. The system utilizes a first sequence and a second sequence of periods in conjunction with wireless packet transmission by several adjacent nodes, thereby (i) preventing a transmission of a downlink packet to a mid-point communication node from interfering with reception of any previous downlink packet in a node adjacent to the mid-point node, (ii) preventing a transmission of an uplink packet to the mid-point node from interfering with reception of any previous uplink packet in yet another node that is also adjacent to the mid-point node, and (iii) preventing transmissions of packets by the mid-point node from interfering with reception of any other packet in the mid-point node. Multiple beams are then used to counter a residual effect of multiple transmissions arriving in the mid-point node at the same time.

20 Claims, 8 Drawing Sheets

SYNCHRONIZING COMMUNICATION IN A BACKHAUL NETWORK

CROSS REFERENCE TO RELATED APPLICATIONS

This Application is a continuation-in-part of U.S. patent application Ser. No. 17/649,408, titled "Packet Specific Beam-Forming Network," filed on Jan. 31, 2022. This Application also claims priority to U.S. Provisional Patent Application No. 63/312,530, titled "Methods for Interference and Latency Reduction Using Wireless Communication in Deep Tree Topologies," filed on Feb. 22, 2022.

TECHNICAL FIELD

This application relates generally to wireless communications.

BACKGROUND

In communication systems, and more specifically in conjunction with wireless topologies constituting a multi-hop backhaul network, inter-node interferences and intra-node interferences can dramatically reduce network capacity, cause unwanted re-transmissions, and diminish the number of hopes that can be used effectively.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One embodiment (FIG. 5A, FIG. 5B) is a system operative to synchronize communication among a plurality of inter-connected communication nodes constituting a wireless backhaul network, comprising: a first communication node comprising a first multi-beam subsystem; a second communication node comprising a second multi-beam subsystem; and a third communication node comprising a third multi-beam subsystem. In one embodiment, the first multi-beam subsystem is configured to use, during a first sequence of periods, a respective downlink beam to transmit downlink packets to the second communication node; the third multi-beam subsystem is configured to use, during the same first sequence of periods, a respective uplink beam to transmit uplink packets to the second communication node; and the second multi-beam subsystem is configured to use, during a second sequence of periods: a respective downlink beam to transmit the downlink packets to the third communication node, and a respective uplink beam to transmit the uplink packets to the first communication node; in which as a result of the first sequence of periods and the second sequence of periods being non-overlapping: the transmission of each of the downlink packets to the second communication node does not interfere with reception of any previous one of the downlink packets in the third communication node; the transmission of each of the uplink packets to the second communication node does not interfere with reception of any previous one of the other uplink packets in the first communication node; and transmission of each of the packets from the second communication node does not interfere with reception of the any others of the packets in the same second communication node.

One embodiment (FIG. 6) is a method for synchronizing communication among a plurality of inter-connected communication nodes constituting a wireless backhaul network, comprising: transmitting, during a first period, and simultaneously using at least two transmitters: (i) a first downlink packet from a first node to a second node via a respective beam, and (ii) a first uplink packet from a third node to the second node via a respective beam; receiving and decoding, during the first period, and simultaneously using at least two receivers: (i) the first downlink packet in the second node via a respective first beam, and (ii) the first uplink packet in the second node via a respective second beam; transmitting, during a second period, and simultaneously using at least two transmitters: (i) the first downlink packet from the second node to the third node via the respective second beam, and (ii) the first uplink packet from the second node to the first node via the respective first beam; receiving and decoding, during the second period, and simultaneously: (i) the first uplink packet in the first node via the respective beam, and (ii) the first downlink packet in the third node via the respective beam; and repeating said transmissions and receptions in conjunction with next uplink and downlink packets and further in conjunction with a third period and a fourth period.

BRIEF DESCRIPTION OF THE DRAWINGS

For a fuller understanding of the nature and advantages of the concepts disclosed herein, reference is made to the detailed description of preferred embodiments and the accompanying drawings. The embodiments are herein described by way of example only, with reference to the accompanying drawings. No attempt is made to show structural details of the embodiments in more detail than is necessary for a fundamental understanding of the embodiments.

DETAILED DESCRIPTION

Figure 1A:
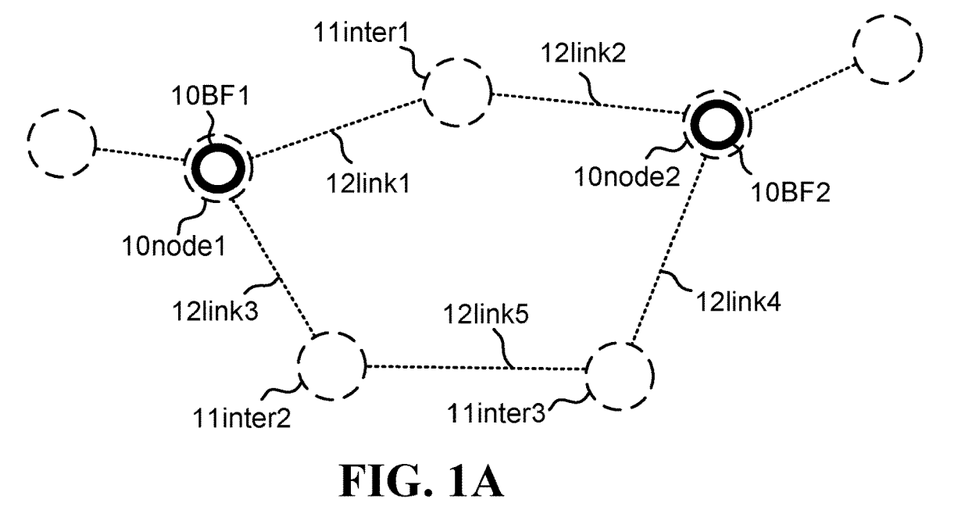
FIG. 1A illustrates one embodiment of a wireless communication network operative to wirelessly transport packets between the different nodes of the network.

FIG. 1A illustrates one embodiment of a wireless communication network operative to wirelessly transport packets between the different nodes of the network. Wireless communication node 10node1 may transmit/receive packets to/from both node 11inter1 via communication link 12link1 and to/from node 11inter2 via communication link 12link3. In a similar fashion, nodes 11inter1 and 10node2 wirelessly exchange packets via communication link 12link2, nodes 11inter3 and 10node2 wirelessly exchange packets via communication link 12link4, and nodes 11inter3 and 10node2 wirelessly exchange packets via communication link 12link5. The communication network may be a wireless mesh network, a backhaul network, a relay network, or a combination thereof. The communication network may be based on, or derived from, cellular transmission standards such as LTE, 4G, and 5G, WiFi (IEEE 802.11) transmission standards, or proprietary standards. The communication network may use licensed frequencies in the sub 1 GHz bands, 1.7-2.3 GHz bands, and 2.5-3.6 GHz bands, or it may use unlicensed frequencies in the 2.4 GHz band and 5 GHz bands. Millimeter-wave frequencies in the 30-70 GHz bands can also be used, as well as other frequency bands, provided that multiple radio-frequency beams can be generated by at least some of the communication nodes in conjunction with packet transmission and via beam forming/switching antenna configurations 10BF1, 10BF2 associated with at least some of the nodes. Nodes 11inter are intermediary nodes in the sense that any packet going from 10node1 to 10node2 has to travel via at least some of the intermediary nodes. The network topology depicted is by way of example and not limitation, provided that there are at least two different paths to propagate packets from 10node1 to 10node2, and provided that beam forming/switching antenna configurations 10BF1, 10BF2 are available in support of the at least two different paths.

Figure 1B:
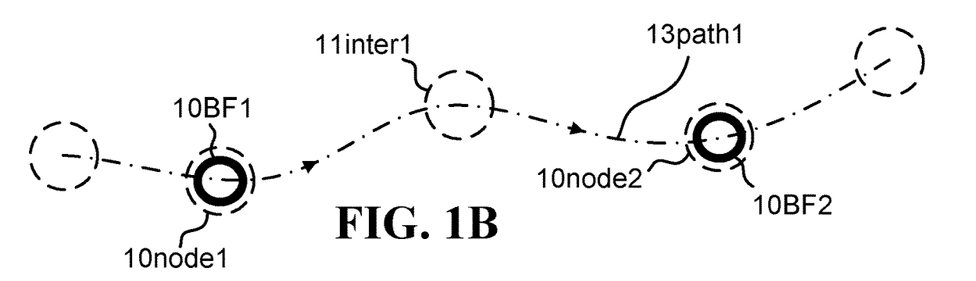
FIG. 1B illustrates one embodiment of one possible transmission path utilized by the wireless communication network to transport packets wirelessly.

FIG. 1B illustrates one embodiment of one possible transmission path utilized by the wireless communication network to transport packets wirelessly. The one possible transmission path 13path1 comprises the nodes 10node1, 11inter1 and 10node2. Other nodes may also be included in path 13path1.

Figure 1C:
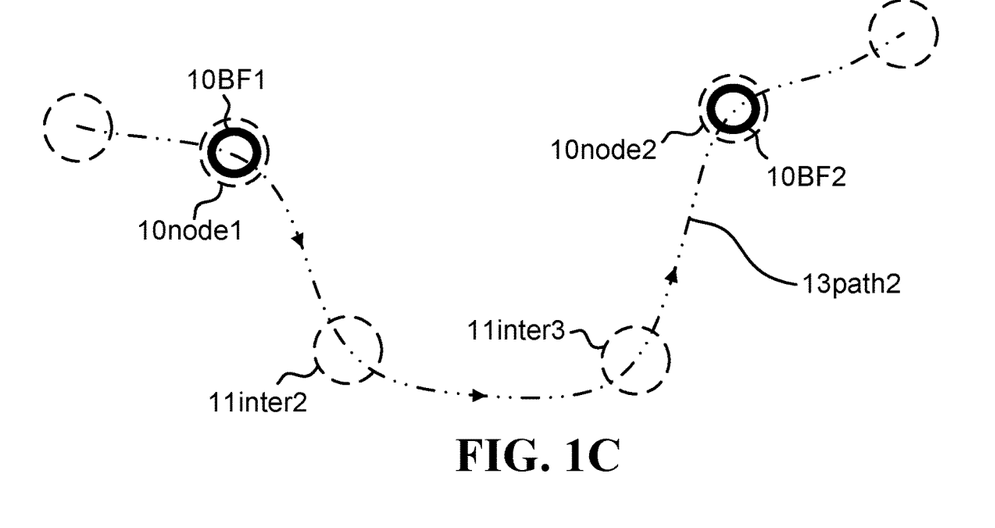
FIG. 1C illustrates one embodiment of another possible transmission path utilized by the wireless communication network to transport packets wirelessly.

FIG. 1C illustrates one embodiment of another possible transmission path utilized by the wireless communication network to transport packets wirelessly. The another possible transmission path 13path2 comprises the nodes 10node1, 11inter2, 11inter3, and 10node2. Other nodes may also be included in path 13path2. Other transmission paths are also possible, provided that they include the nodes 10node1 and 10node2, and a new combination of intermediary nodes 11inter connecting them. The intermediary nodes 11inter may be excusive for each path, but, alternatively, any intermediary node may serve more than one path. Each of the depicted paths 13path1 and 13path2 have an exclusive set of intermediary nodes by way of example.

Figure 1D:
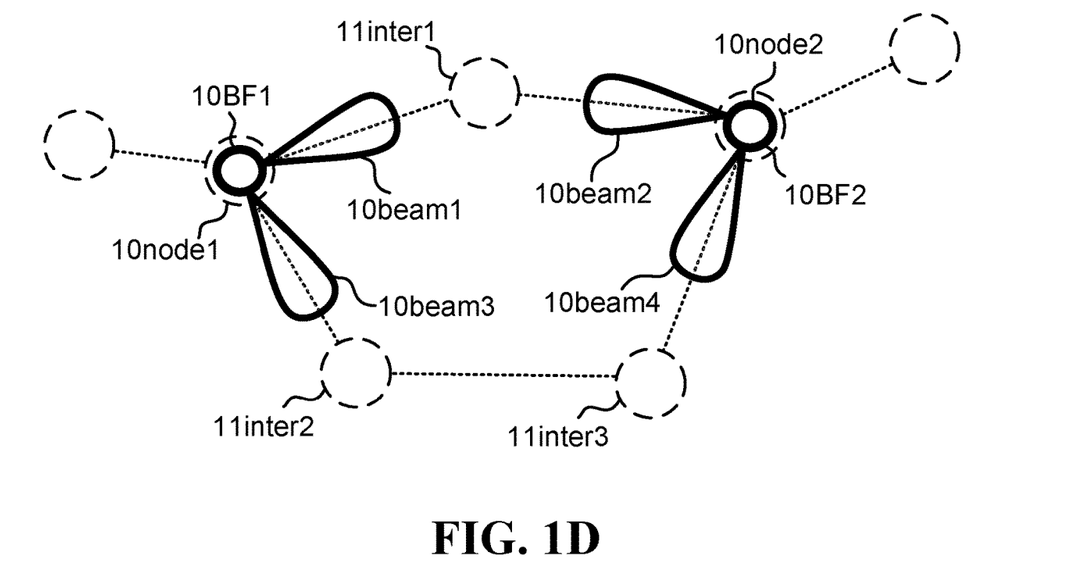
FIG. 1D illustrates one embodiment of beam-forming elements operating in at least some nodes of the network and generating several possible beam combinations.

FIG. 1D illustrates one embodiment of beam-forming elements operating in at least some nodes of the network and generating several possible beam combinations. Beam forming/switching element 10BF1 of 10node1 transmits/receives packets to/from 11inter1 via a dedicated beam 10beam1 that is directed toward 11inter1, and transmits/receives packets to/from 11inter2 via another dedicated beam 10beam3 that is directed toward 11inter2. Beam forming/switching element 10BF2 of 10node2 may transmit/receive packets to/from 11inter1 via a dedicated beam 10beam2 that is directed toward 11inter1, and may transmit/receive packets to/from 11inter3 via another dedicated beam 10beam4 that is directed toward 11inter2. When transmitting a packet via 13path1, the packet is transmitted by 10BF1 via 10beam1, and may be received by 10BF2 via 10beam2. When transmitting a packet via 13path2, the packet is transmitted by 10BF1 via 10beam3, and may be received by 10BF2 via 10beam4. Transmissions via 10beam1 may occur in parallel to transmissions via 10beam3, or may occur in conjunction with a time division scheme so as to allow only one of the beams 10beam1, 10beam3 to be active at a time. The purpose of the beams 10beam is to increase system gain, increase bit rates, extend transmission distances, lower transmission power, improve frequency reuse, lower inter-node interferences, or any combination thereof.

Figure 1E:
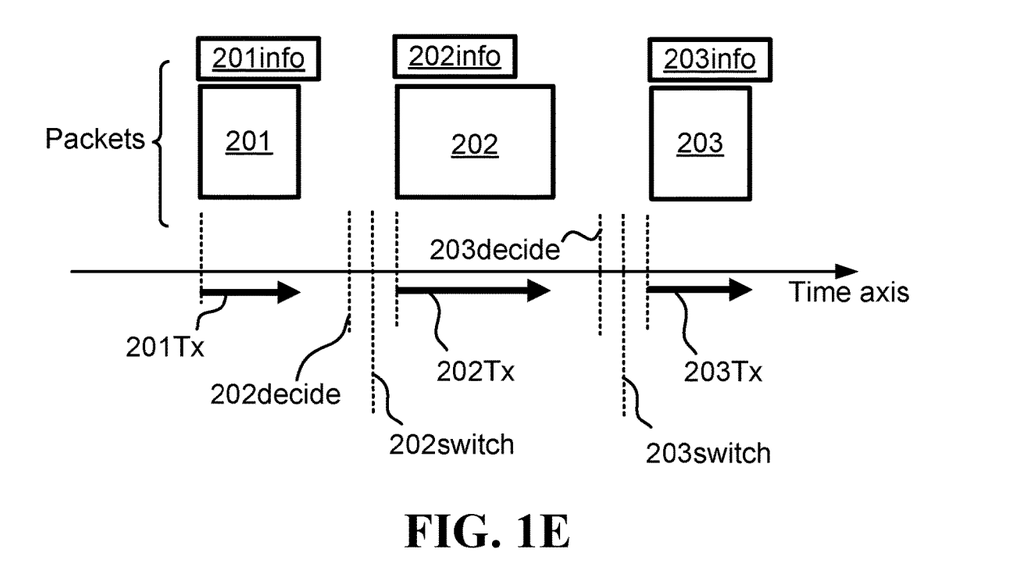
FIG. 1E illustrates one embodiment of packets being wirelessly transported via the various paths of the network and on a packet-by-packet basis.

FIG. 1E illustrates one embodiment of packets being wirelessly transported via the various paths of the network and on a packet-by-packet basis. Packet 201, which may be an Internet Protocol (IP) packet, is associated with packet information 201info that may be related to the type of the packet (e.g., Transmission Control Protocol/Internet Protocol (TCP/IP), User Datagram Protocol (UDP), or Real-time Transport Protocol (RTP)), size of the packet, a Quality of Service (QoS) level associated with the packet, a latency requirement of the packet, a functionality associated with the packet (e.g., VoIP, Video, non-real-time), or combinations thereof. In a similar fashion, packet 202 is associated with packet information 202info and packet 203 is associated with packet information 203info. The packet information (e.g., 201 info) may be embedded in the respective packet (201 in this case) in a form of a certain field, it may be transmitted/obtained separately to the respective packet, it may be derived by the system based on packet metrics, it can be obtained in other ways, or in a combination of several such ways. The packet information may be related to a single packet (as depicted by way of example), or to several packets associated with one another.

The system may conclude, based on 202info, that packet 202 does not require fast transport between 10node1 and 10node2, and therefore, the system may reach a decision (202decide) to use path 13path2 as the path for transmitting packet 202, which, for example, may be a slower path than 13path1. As a direct result of such decision 202decide, the system, using 10BF1, then switches/directs/synthesizes (202switch) the transmission of packet 202 via 10beam3, which facilitates transmission (202Tx) in conjunction with 13path2 and 11inter2. 10node2, via 10BF2, may then sense a direction from which packet 202 is arriving, and receive packet 202 via 10beam4, or packet 202 may be received omnidirectionally. The time from the decision to switch 202decide, through the completion of the switching 202switch action, and actual transmission of the packet 202Tx must be short enough to deal with network-level timing, and in general should be kept below 10 microseconds, which is readily achievable using solid state antenna switching/directing/synthesizing techniques. The system may then conclude, based on 203info, that packet 203 needs to be transported as fast as possible between 10node1 and 10node2, and therefore, the system may reach a decision (203decide) to use path 13path1 as the path for transmitting packet 203, which, for example, may be a faster path than 13path2. As a direct result of the decision 203decide, the system, using again 10BF1, then switches/directs/synthesizes (203switch) the transmission of packet 203 via 10beam1, which facilitates transmission (203Tx) in conjunction with 13path1 and 11inter1. 10node2, again via 10BF2, may then sense a direction from which packet 203 is arriving, and receive packet 203 via 10beam2, or packet 203 may be received omnidirectionally. In reality, different packets needs to be switched to the different paths at a very high rate, which may be higher than 10,000 packets per second, and as a result the beam configurations 10beam may change thousands of times per second as the packets, of different types, stream through the network. Movement of packets may also be in the opposite direction (from 10node2 to 10node1) in a similar fashion and switching rapidly between the different paths 13path.

In one embodiment, small packets requiring low latencies (e.g., packet 203) may be blocked by bigger packets that can tolerate higher latencies (e.g., packet 202), and therefore, by diverting the bigger tolerant packets 202 into path 13path2, the "fast lane" 13path1 is kept "clear" for the smaller packets 203, 201 to propagate fast.

Figure 2A:
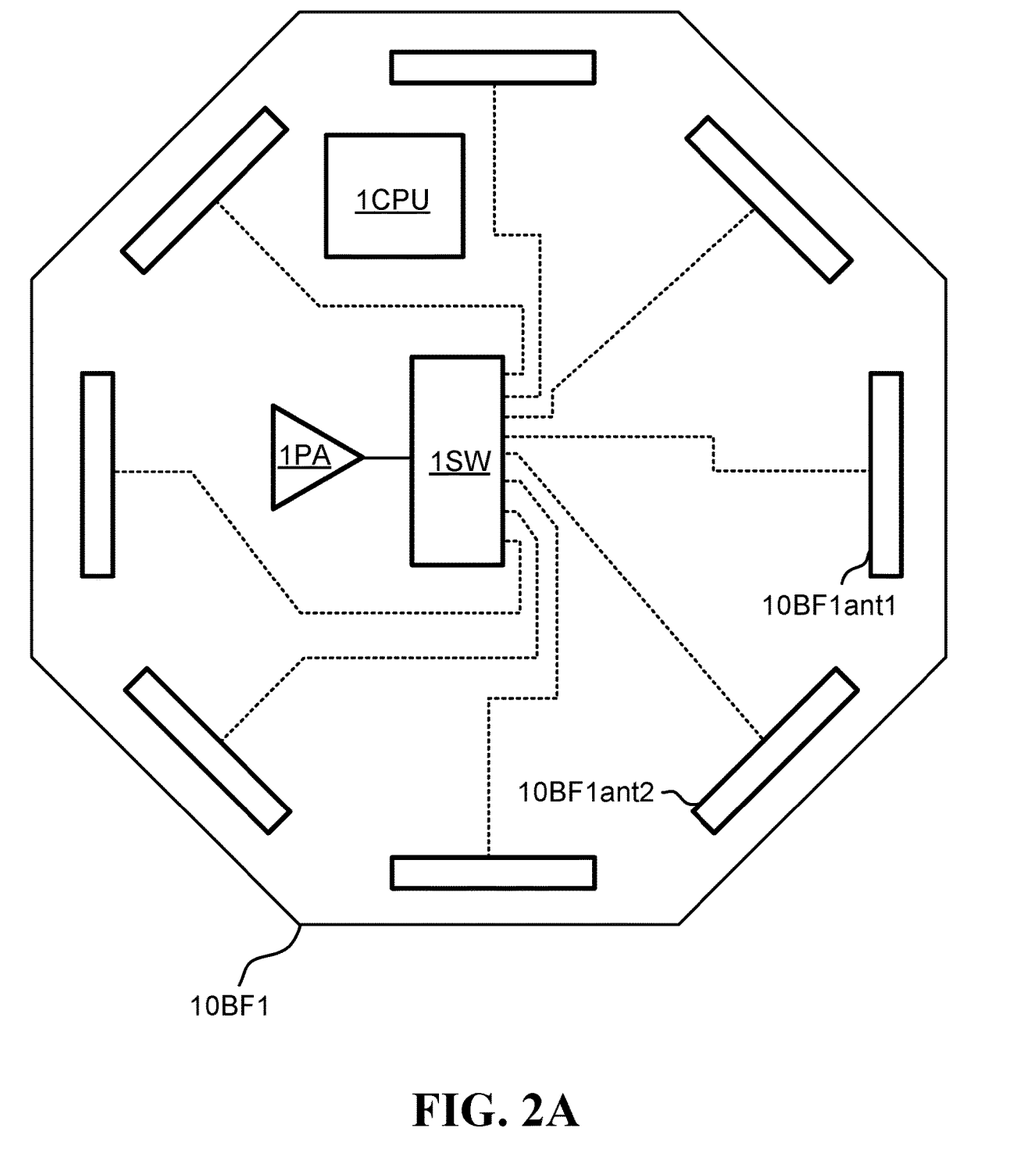
FIG. 2A illustrates one embodiment of a beam switching subsystem within at least some of the nodes of the network.

FIG. 2A illustrates one embodiment of a beam switching subsystem within at least some of the nodes of the network. Beam switching subsystem 10BF1 comprises several antennas 10BF1ant (eight are depicted by way of example), an RF switching component/s 1SW (e.g., PIN diodes). A computer 1CPU controls, using 1SW, the switching 202switch, 203switch between antennas 10BF1ant1 and 10BF1ant2 based on the packet-by-packet decisions made 202decide, 203decide. The decisions may be done using 1CPU, or using another computer in 10node1. Components such as RF power amplifiers 1PA for RF transmission are depicted, but other components, e.g. low-noise amplifiers (LNAs) for reception, and other components are not shown for the sake of simplicity. The computer 1CPU can include a processor that executes software and/or instructions (e.g., stored in memory operably coupled to the computer 1CPU) to control the switching 202switch, 203switch and/or to perform other functions as described herein.

Figure 2B:
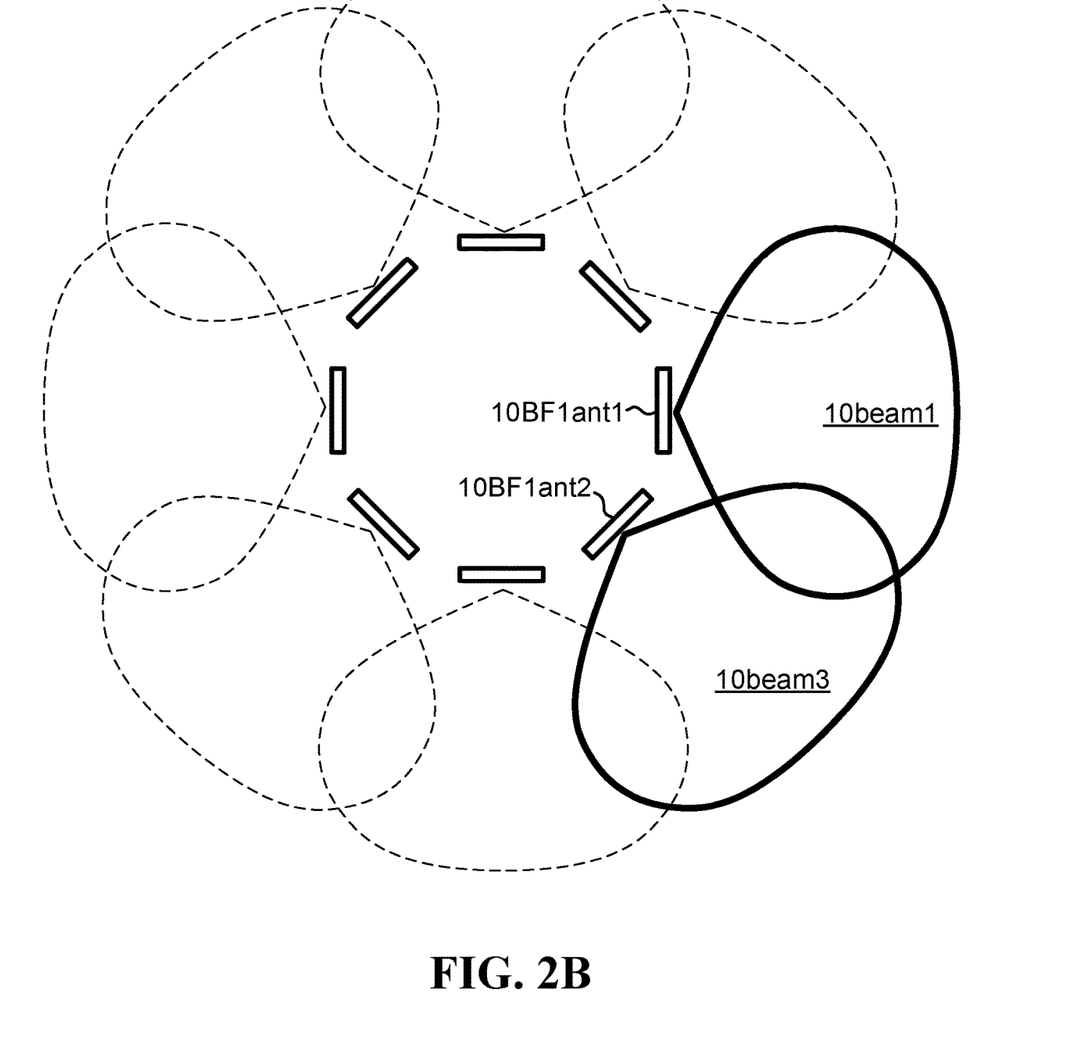
FIG. 2B illustrates one embodiment of possible beam combinations generated by the beam switching subsystem.

FIG. 2B illustrates one embodiment of possible beam combinations generated by the beam switching subsystem 10BF1. 10beam1 is generated by antenna 10BF1ant1, and 10beam3 is generated by antenna 10BF1ant2.

Figure 3:
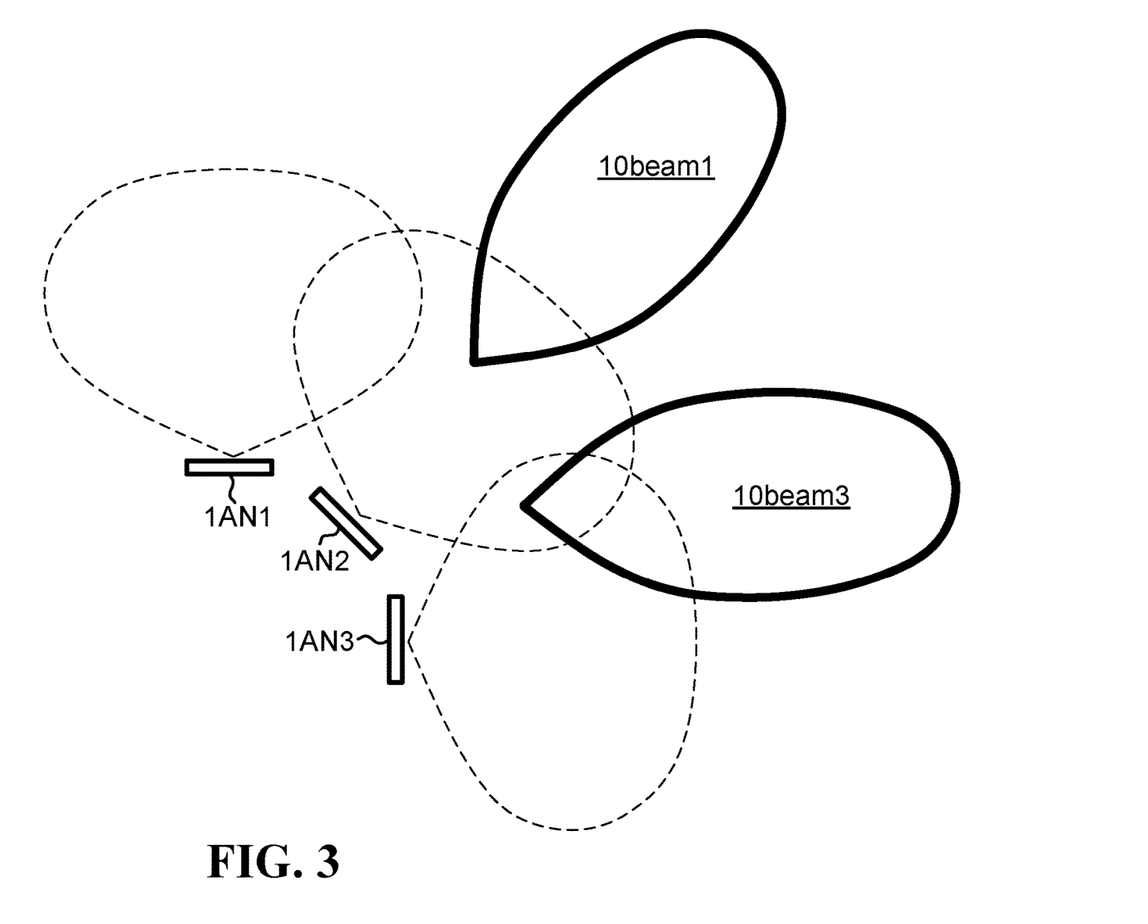
FIG. 3 illustrates one embodiment of a phased-array beamforming subsystem within at least some of the nodes of the network and some possible beam combinations generated by the beamforming subsystem.

FIG. 3 illustrates one embodiment of a phased-array beamforming subsystem 10BF within at least some of the nodes of the network and some possible beam combinations generated by the beamforming subsystem. 10beam1 is generated by adjusting relative transmission phases between antennas 1AN1, 1AN2, 1AN3, and 10beam3 is generated by re-adjusting relative transmission phases between antennas 1AN1, 1AN2, 1AN3.

One embodiment is a system operative to wirelessly transport data from a first communication node to a second communication node using multiple beam directions and based on packet-related information, comprising: a first communication node 10node1 (FIG. 1A) comprising a first multi-beam subsystem 10BF1; a second communication node 10node2 comprising a second multi-beam subsystem 10BF2; and a plurality of at least a first 11inter1 and a second 11inter2 intermediary nodes.

It should be noted that multiple beam functionality, or the term multibeam herein, can refer to temporally sequential generation of energy beams, each principally directed towards a respective spatial direction, or, the simultaneous generation of a plurality of beams, each principally directed towards a respective spatial direction. In the first example, the system may comprise one or more RF antenna or source elements configured and arranged to generate and transmit RF energy encoding communication signals along a direction, e.g., towards or having a main energy lobe as seen on a Bode plot, directed at an intended receiver, e.g., towards the East with respect to the transmitting element(s). The system may thus transmit wireless communications towards the receiver at an Easterly direction. The system may then at a later time generate and direct wireless energy in a lobe directed to the North to be received best by an intended other receiver in a Northerly direction, and so on. We note that the system can operate in an interleaved mode whereby a first single main lobe as described is generated in a first direction of interest towards a first receiver, interleaved with or alternatingly in time with a second single main lobe generated in a second direction of interest towards a second receiver. In the second example, a phased array of a plurality of RF antennas or source elements is configured and arranged to generate two or more temporally co-existing (simultaneous) energy lobes as seen on a Bode plot, which can be directed towards two or more corresponding spatial directions so as to simultaneously deliver communication signals or packets to two or more receivers located at the two or more spatial directions with respect to the transmitter. Thus, any of the above methods of directing energy towards multiple receivers, in respective directions with respect to the transmitter, are possible with the present multibeam feature.

In one embodiment, the system is configured to: transmit 201Tx a first packet 201 (FIG. 1E) associated with a first packet-related information via a first path 13path1 (FIG. 1B) comprising the first communication node 10node1, the first intermediary node 11inter1, and the second communication node 10node2, in which in facilitation of said transmission: the first multi-beam subsystem 10BF1 is configured to use a first beam direction 10beam1 (FIG. 1D), and the second multi-beam subsystem 10BF2 is configured to use a second beam direction 10beam2; and then transmit 202Tx a second packet 202 (FIG. 1E) associated with a second packet-related information via a second path 13path2 (FIG. 1C) comprising the first communication node 10node1, the second intermediary node 11inter2, and the second communication node 10node2, in which immediately prior to said transmission of the second packet: the first multi-beam subsystem 10BF1 is configured to switch 202switch (FIG. 1E) into a third beam direction 10beam3 (FIG. 1D) operative to facilitate transmission toward the second intermediary node 11inter2, and the second multi-beam subsystem 10BF2 is configured to switch into a fourth beam direction 10beam4 operative to receive the transmission from one of the intermediary nodes (e.g., 11inter3).

In one embodiment, said switching 202switch associated with the first communication node 10node1 is done based on the second packet 202 being associated with the second packet-related information, and on a packet-by-packet basis.

In one embodiment, the system is further configured to transmit 203Tx (FIG. 1E), via the first path 13path1, a third packet 203 (FIG. 1E) having a different packet-related information than the second packet 202, in which immediately prior to said transmission: the first multi-beam subsystem 10BF1 switches back 203switch (FIG. 1E) to a state facilitating transmission via the first path.

In one embodiment, said packet-related information is conveyed in the packets. In one embodiment, said packet-related information is out-of-band of the packets. In one embodiment, said packet-related information is derived from type and/or size of data carried by the packets.

In one embodiment, each of the communication nodes 10node switches beam directions asynchronously with the other nodes, in which said switching is done on a packet-by-packet basis.

In one embodiment, the packet-related information is associated with different types of packets that comprise a type associated with at least one of: (i) TCP/IP, (ii) UDP, and/or (iii) RTP.

In one embodiment, the packet-related information is associated with different types of applications that comprise an application associated with at least one of: (i) voice over IP (VoIP), (ii) video streaming, and/or (iii) non-latency critical applications.

In one embodiment, said switching 202switch associated with the first communication node 10node1 occurs in less than 10 (ten) microsecond from determining 202 decide (FIG. 1E) the association of the second packet 202 with the second packet-related information.

In one embodiment, said multi-beam subsystem 10BF1, 10BF2 is of a type comprising associated with at least one of: (i) beam switching (FIG. 2A, FIG. 2B), (ii) phased array (FIG. 3), and/or (iii) butler matrix.

In one embodiment, the first path 13path1 is associated with a first latency that is lower than a second latency associated with the second path 13path2, in which said first packet 201 is determined to require a better (e.g., lower) latency than a latency required by the second packet 202, and in which said determination is based on the packet-related information.

In one embodiment, the transmissions 201Tx, 202Tx, 203Tx are associated with at least one of: (i) WiFi transmissions, (ii) cellular transmissions, (iii) micro-waves transmissions, and/or (iv) millimeter-wave transmissions.

In one embodiment, said multi-beam subsystems are operative to increase a system gain associated with the system by at least 10 (ten) decibel (dB).

Figure 4:
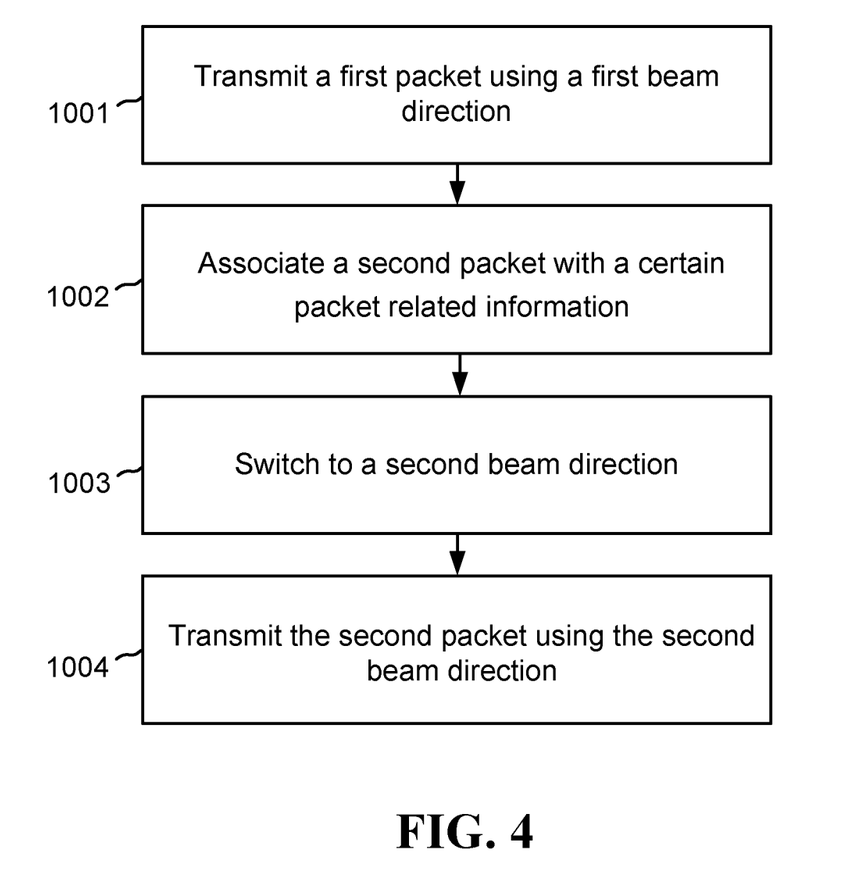
FIG. 4 illustrates one embodiment of a method for wirelessly transporting data from a first communication node to a second communication node using multiple beam directions and based on packet-related information.

FIG. 4 illustrates one embodiment of a method for wirelessly transporting data from a first communication node to a second communication node using multiple beam directions and based on packet-related information. The method includes: in step 1001, transmitting 201Tx a first packet 201 (FIG. 1E) associated with a first packet-related information via a first path 13path1 (FIG. 1B) comprising a first communication node 10node1, a first intermediary node 11inter1, and a second communication node 10node2, using a first beam direction 10beam1 (FIG. 1D). In step 1002, determining that a second packet 202 (FIG. 1E) associated with a second packet-related information is about to be transmitted. In step 1003, switching 202switch (FIG. 1E), as a result of said determination, into another beam direction 10beam3 (FIG. 1D) operative to facilitate transmission toward a second intermediary node 11inter2. In step 1004, transmitting 202Tx the second packet 202 (FIG. 1E) associated with the second packet-related information via a second path 13path2 (FIG. 1C) comprising the first communication node 10node1, the second intermediary node 11inter2, and the second communication node 10node2.

In one embodiment, said switching is momentary and for the purpose of transmitting said second packet associated with the second packet-related information, in which the method further comprises: switching back to the first path for a next packet in line for transmission.

In one embodiment, the second communication node is a destination of both the first and second packets. In one embodiment, the second communication node is a final destination of both the first and second packets.

In one embodiment, the communication nodes are part of a wireless mesh topology, in which the first path and the second path represents two different ways of propagating the packets from the first to the second communication nodes.

One embodiment is a system operative to wirelessly transport data from a first communication node to a second communication node using multiple beam directions and based on packet-related information, comprising: a first communication node 10node1 (FIG. 1A) comprising a first multi-beam subsystem 10BF1; and a second communication node 10node2.

In one embodiment, the system is configured to: transmit 201Tx a first packet 201 (FIG. 1E) associated with a first packet-related information via a first path 13path1 (FIG. 1B) comprising the first and the second communication nodes, in which in facilitation of said transmission: the first multi-beam subsystem 10BF1 is configured to use a first beam direction 10beam1 (FIG. 1D); and then transmit 202Tx a second packet 202 (FIG. 1E) associated with a second packet-related information via a second path 13path2 (FIG. 1C) comprising the first and the second communication nodes, in which: (i) immediately prior to said transmission of the second packet: the first multi-beam subsystem 10BF1 is configured to switch 202switch (FIG. 1E) into another beam direction 10beam3 (FIG. 1D), and (ii) said switching 202switch associated with the first communication node 10node1 is done based on the second packet 202 being associated with the second packet-related information, and on a packet-by-packet basis.

Figure 5A:
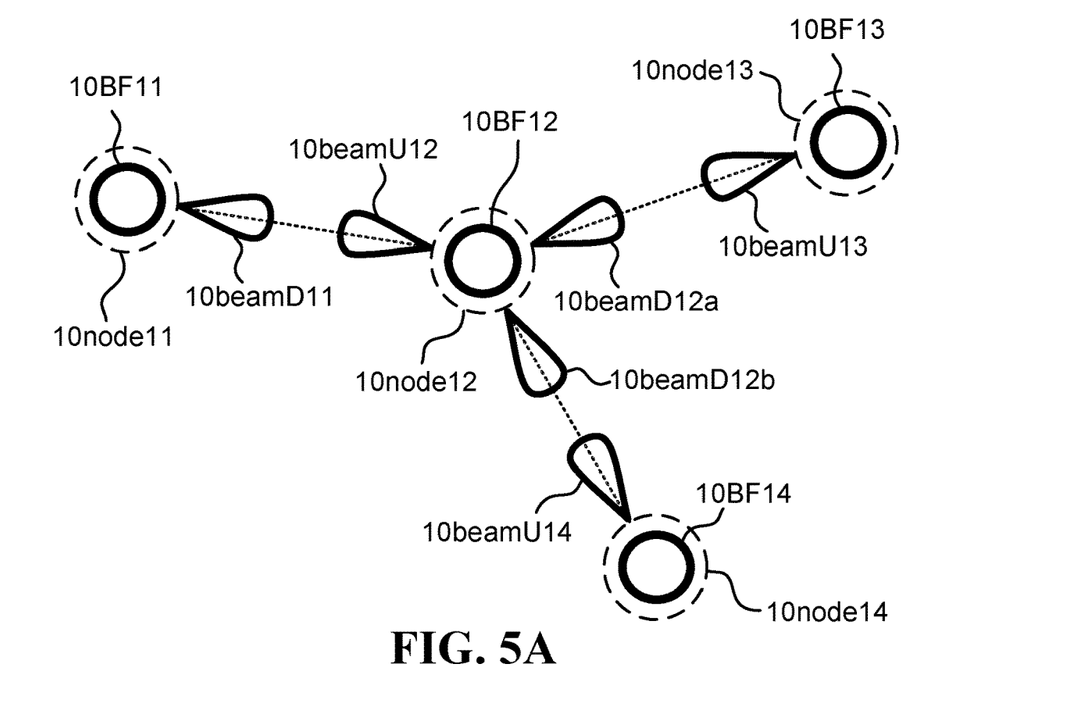
FIG. 5A illustrates one embodiment of a wireless backhaul network operative to effectively transport both uplink packets and downlink packets.

FIG. 5A illustrates one embodiment of a wireless backhaul network operative to effectively transport both uplink packets and downlink packets. A first communication node 10node11 uses a multi-beam subsystem 10BF11 to wirelessly transmit and receive packets via beam 10beamD11. A second communication node 10node12 uses a multi-beam subsystem 10BF12 to wirelessly transmit and receive packets via beams 10beamU12, 10beamD12a, and 10beam12b. A third communication node 10node13 uses a multi-beam subsystem 10BF13 to wirelessly transmit and receive packets via beam 10beamU13. A fourth communication node 10node14 uses a multi-beam subsystem 10BF14 to wirelessly transmit and receive packets via beam 10beamU14.

Figure 5B:
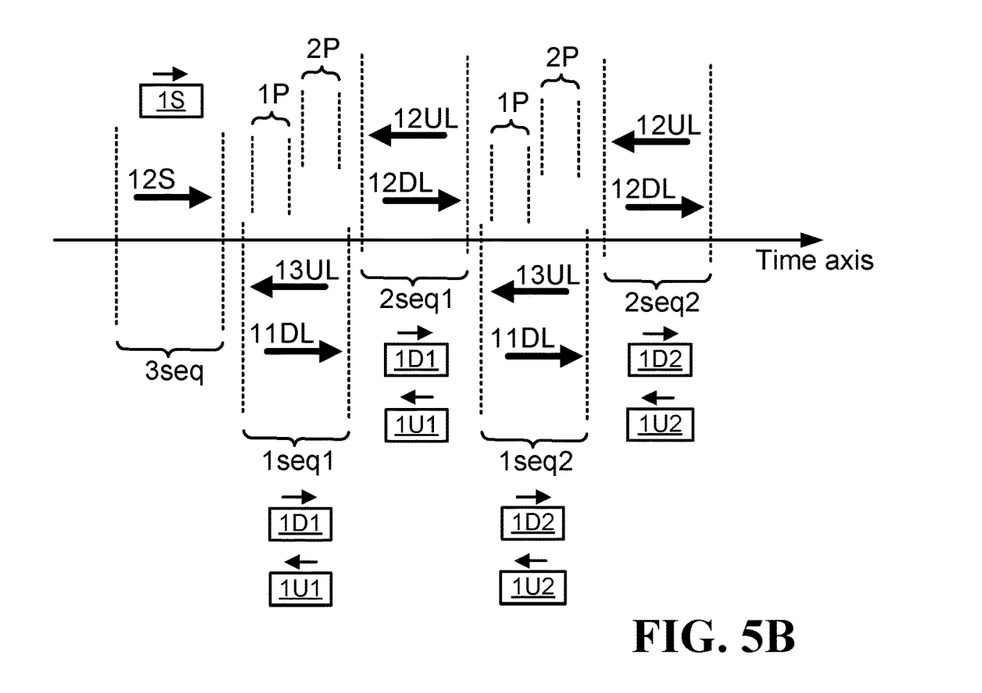
FIG. 5B illustrates one embodiment of transmissions occurring in conjunction with the wireless backhaul network.

FIG. 5B illustrates one embodiment of transmissions occurring in conjunction with the wireless backhaul network. During period 1seq1: node 10node11 transmits 11DL the downlink packet 1D1 to node 10node12, and node 10node13 transmits 13UL the uplink packet 1U1 to node 10node12. During period 2seq1: node 10node12 transmits 12DL the downlink packet 1D1 to node 10node13, and transmits 12UL the uplink packet 1U1 to node 10node11.

During period 1seq2: node 10node11 transmits 11DL the downlink packet 1D2 to node 10node12, and node 10node13 transmits 13UL the uplink packet 1U2 to node 10node12. During period 2seq2: node 10node12 transmits 12DL the downlink packet 1D2 to node 10node13, and transmits 12UL the uplink packet 1U2 to node 10node11.

During period 3seq: synchronization information 1S is transmitted 12S from node 10node12 to nodes 10node13 and 10node14, and then used by nodes 10node13 and 10node14 to avoid collisions when transmitting back to node 10node12. For example, synchronization information 1S may instruct node 10node13 to transmit, e.g., 13UL, during slot 1P, and instruct node 10node14 to transmit during slot 2P.

One embodiment is a system operative to synchronize communication among a plurality of inter-connected communication nodes constituting a wireless backhaul network, comprising: a first communication node 10node11 comprising a first multi-beam subsystem 10BF11; a second communication node 10node12 comprising a second multi-beam subsystem 10BF12; and a third communication node 10node13 comprising a third multi-beam subsystem 10BF13.

In one embodiment, the first multi-beam subsystem 10BF11 is configured to use, during a first sequence of periods 1seq1, 1seq2, a respective downlink beam 10beamD11 to transmit 11DL downlink packets 1D1, 1D2 to the second communication node 10node12; the third multi-beam subsystem 10BF13 is configured to use, during the same first sequence of periods 1seq1, 1seq2, a respective uplink beam 10beamU13 to transmit 13UL uplink packets 1U1, 1U2 to the second communication node 10node12; and the second multi-beam subsystem 10BF12 is configured to use, during a second sequence of periods 2seq1, 2seq2: a respective downlink beam 10beamD12a to transmit 12DL the downlink packets 1D1, 1D2 to the third communication node 10node13, and a respective uplink beam 10beamU12 to transmit 12UL the uplink packets 1U1, 1U2 to the first communication node 10node11; in which as a result of the first sequence of periods 1seq1, 1seq2 and the second sequence of periods 2seq1, 2seq2 being non-overlapping: the transmission 11DL of each of the downlink packets, e.g., 1D2 to the second communication node 10node12, does not interfere with reception of any previous one of the downlink packets, e.g., 1D1, in the third communication node 10node13; the transmission 13UL of each of the uplink packets, e.g., 1U2, to the second communication node 10node12, does not interfere with reception of any previous one of the other uplink packets, e.g., 1U1, in the first communication node 10node11; and transmission 12UL, 12DL of each of the packets from the second communication node 10node12 does not interfere with reception of the any others of the packets in the same second communication node 10node12, as the second communication node either transmits or receives at any given time, but not both.

In one embodiment, the system further comprises a fourth communication node 10node14 comprising a fourth multi-beam subsystem 10BF14, wherein: said uplink packets transmitted 13UL to the second communication node 10node12 from the third communication node 10node13 are transmitted during certain first portions 1P within the first sequence of periods 1seq1, 1seq2; and the fourth multi-beam subsystem 10BF14 is configured to use, in conjunction with the first sequence of periods 1seq1, 1seq2, but during certain second portions 2P within the first sequence of periods, a respective uplink beam 10beamU14 to transmit other uplink packets to the second communication node 10node12; in which: the first portions 1P and the second portions 2P are non-overlapping, and therefore the uplink packets do not interfere with the other uplink packets when received in the second communication node 10node12.

In one embodiment, the system is configured to schedule the transmissions in the first and second portions 1P, 2P using synchronization messages 1S transmitted 12S by the second communication node 10node12 to the third and fourth communication nodes 10node13, 10node14 via a third sequence of periods 3seq that are non-overlapping with the first and second sequences of periods 1seq1, 1seq2, 2seq1, 2seq2.

In one embodiment, the synchronization messages 1S are transmitted 12S in conjunction with a certain system gain that is higher than a system gain associated with transmission 12UL, 12DL, 13UL, 11DL of said various packets, and therefore said synchronization messages have an inherent resistance to interferences.

In one embodiment, said higher certain system gain is a result of the synchronization messages 1S being transmitted 12S using a QPSK symbol modulation or lower, and the various packets being transmitted 12UL, 12DL, 13UL, 11DL using a 64QAM symbol modulation or higher.

In one embodiment, said higher certain system gain is a result of the synchronization messages 1S being transmitted 12S using a radio-frequency bandwidth of 10 MHz or lower, and the various packets being transmitted 12UL, 12DL, 13UL, 11DL using a radio-frequency bandwidth of 20 MHz or higher.

In one embodiment, the transmissions 12UL, 12DL, 13UL, 11DL are WiFi transmissions using an unlicensed radio-frequency band.

In one embodiment, the transmissions 12UL, 12DL, 13UL, 11DL are cellular transmissions using licensed radio-frequency band.

In one embodiment, all of the transmissions 12UL, 12DL, 13UL, 11DL utilize the same radio-frequency channel, in which said utilization is facilitated by at least the first sequence of periods and the second sequence of periods being non-overlapping.

In one embodiment, the various beams 10beamU, 10beamD are associated with an antenna gain of at least 5 dBi, therefore increasing a system gain associated with the various transmissions 12UL, 12DL, 13UL, 11DL.

In one embodiment, said antenna gain is realized using at least one of: (i) beam switching, (ii) phase array, and/or (iii) butler matrix.

In one embodiment, said antenna gain is operative to facilitate simultaneous reception of the downlink transmissions 11DL and the uplink transmissions 13UL at the second communication node 10node12, as the associated beams 10beamU12, 10beamD12a, that are used to receive the transmissions, point to different directions.

In one embodiment, each of the multi-beam subsystems 10BF comprises at least two radio-frequency power amplifiers, thereby facilitating simultaneous transmission, e.g., 12UL, 12DL, of the downlink packets and the uplink packets.

In one embodiment, each of the multi-beam subsystems 10BF comprises at least two radio-frequency low-noise amplifiers, thereby facilitating simultaneous reception of the downlink packets and the uplink packets, e.g., simultaneous reception of 1D1 and 1U1 at 10node12.

In one embodiment, the downlink packets are transmitted 11DL, 12DL via an access-point associated with each of the communication nodes 10node11, 10node12.

In one embodiment, the uplink packets are transmitted 13UL, 12UL via a client-side station associated with each of the communication nodes 10node13, 10node12.

In one embodiment, the system operates at microwave frequencies of between 700 MHz and 6 GHz.

In one embodiment, the system operates at millimeter-wave frequencies of between 6 GHz and 300 GHz, in which the various beams 10beamU, 10beamD are associated with an antenna gain of at least 20 dBi, therefore increasing a system gain associated with the various transmissions 12UL, 12DL, 13UL, 11DL.

Figure 6:
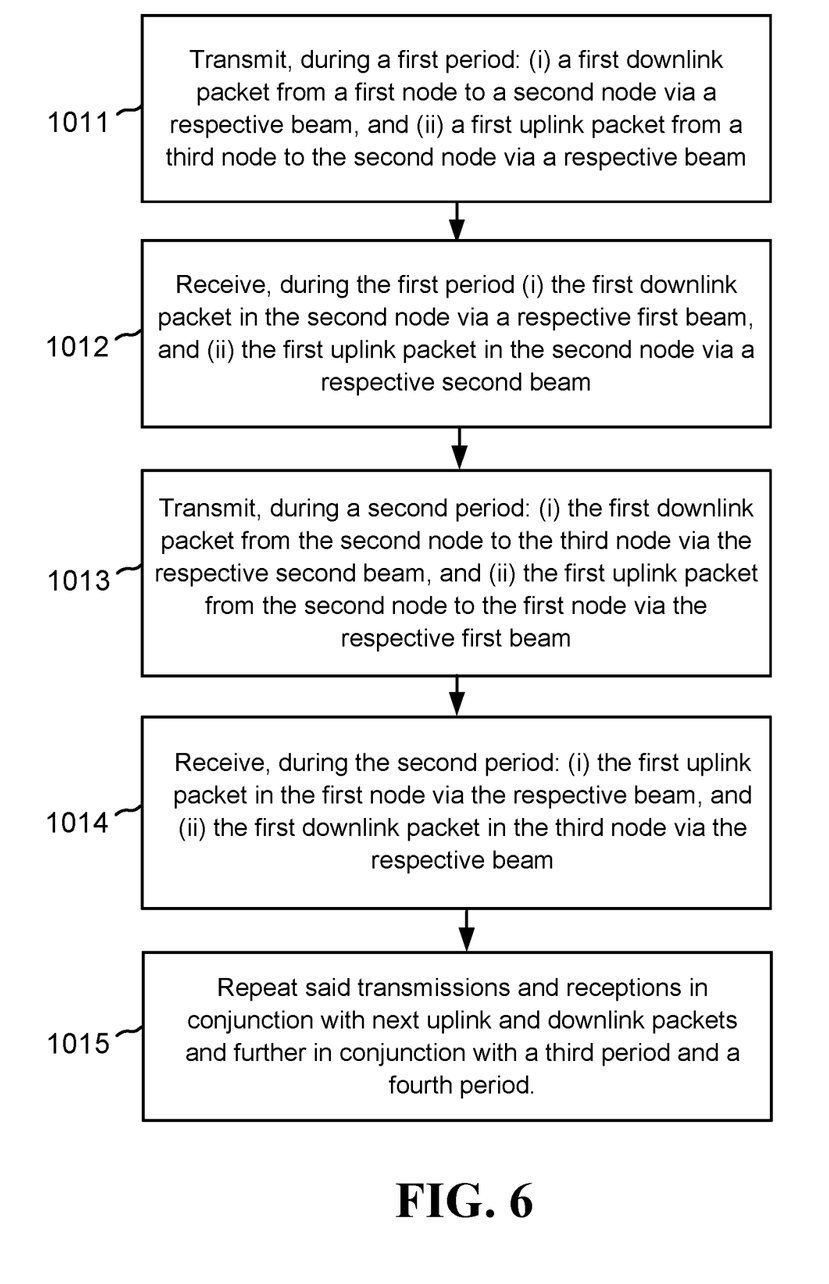
FIG. 6 illustrates one embodiment of a method for synchronizing communication among a plurality of inter-connected communication nodes constituting the wireless backhaul network.

FIG. 6 illustrates one embodiment of a method for synchronizing communication among a plurality of inter-connected communication nodes constituting the wireless backhaul network. The method includes: in step 1011: transmitting, during a first period 1seq1, and simultaneously using at least two transmitters: (i) a first downlink packet 1D1 from a first node 10node11 to a second node 10node12 via a respective beam 10beamD11, and (ii) a first uplink packet 1U1 from a third node 10node13 to the second node 10node12 via a respective beam 10beamU13. In step 1012: receiving and decoding, during the first period 1seq1, and simultaneously using at least two receivers: (i) the first downlink packet 1D1 in the second node 10node12 via a respective first beam 10beamD12, and (ii) the first uplink packet 1U1 in the second node 10node12 via a respective second beam 10beamD12$a$. In step 1013: transmitting, during a second period 2seq1, and simultaneously using the at least two transmitters: (i) the first downlink packet 1D1 from the second node 10node12 to the third node 10node13 via the respective second beam 10beamD12$a$, and (ii) the first uplink packet 1U1 from the second node 10node12 to the first node 10node11 via the respective first beam 10beamU12; in step 1014: receiving and decoding, during the second period 2seq1, and simultaneously: (i) the first uplink packet 1U1 in the first node 10node11 via the respective beam 10beamD11, and (ii) the first downlink packet 1D1 in the third node 10node13 via the respective beam 10beamU13. In step 1015: repeating said transmissions and receptions in conjunction with next uplink and downlink packets 1U2, 1D2 and further in conjunction with a third period 1seq2 and a fourth period 2seq2.

In one embodiment, the wireless backhaul includes additional nodes and is associated with a network topology comprising at least one of (i) a mesh, (ii) a deep tree, (iii) a star, and (iv) a line.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases.

Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embodied in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A system operative to synchronize communication among a plurality of inter-connected communication nodes constituting a wireless backhaul network, comprising:
    a first communication node comprising a first multi-beam subsystem;
    a second communication node comprising a second multi-beam subsystem; and
    a third communication node comprising a third multi-beam subsystem;
    wherein:
        the first multi-beam subsystem is configured to use, during a first sequence of periods, a respective downlink beam to transmit downlink packets to the second communication node;
        the third multi-beam subsystem is configured to use, during the same first sequence of periods, a respective uplink beam to transmit uplink packets to the second communication node; and
        the second multi-beam subsystem is configured to use, during a second sequence of periods: a respective downlink beam to transmit the downlink packets to the third communication node, and a respective uplink beam to transmit the uplink packets to the first communication node;
    wherein as a result of the first sequence of periods and the second sequence of periods being non-overlapping:
        the transmission of each of the downlink packets to the second communication node does not interfere with reception of any previous one of the downlink packets in the third communication node;
        the transmission of each of the uplink packets to the second communication node does not interfere with reception of any previous one of the uplink packets in the first communication node; and
        the transmission of each of the downlink and/or uplink packets from the second communication node does not interfere with reception of any of the downlink and/or uplink packets in the same second communication node.

2. The system of claim 1, further comprising a fourth communication node comprising a fourth multi-beam subsystem, wherein:

said uplink packets transmitted to the second communication node from the third communication node are transmitted during certain first portions within the first sequence of periods; and the fourth multi-beam subsystem is configured to use, in conjunction with the first sequence of periods, but during certain second portions within the first sequence of periods, a respective uplink beam to transmit other uplink packets to the second communication node;

wherein:

the first portions and the second portions are non-overlapping, and therefore the uplink packets do not interfere with the other uplink packets when received in the second communication node.

3. The system of claim 2, wherein the system is configured to schedule the transmissions in the first and second portions using synchronization messages transmitted by the second communication node to the third and fourth communication nodes via a third sequence of periods that are non-overlapping with the first and second sequences of periods.

4. The system of claim 3, wherein the synchronization messages are transmitted in conjunction with a certain system gain that is higher than a system gain associated with transmission of said uplink and/or downlink packets, and therefore said synchronization messages have an inherent resistance to interferences.

5. The system of claim 4, wherein said higher certain system gain is a result of the synchronization messages being transmitted using a quadrature phase shift keying (QPSK) symbol modulation or lower, and the uplink and/or downlink packets being transmitted using a 64 quadrature amplitude modulation (64QAM) symbol modulation or higher.

6. The system of claim 4, wherein said higher certain system gain is a result of the synchronization messages being transmitted using a radio-frequency bandwidth of 10 MHz or lower, and the uplink and/or downlink packets being transmitted using a radio-frequency bandwidth of 20 MHz or higher.

7. The system of claim 1, wherein the transmissions are WiFi transmissions using an unlicensed radio-frequency band.

8. The system of claim 1, wherein the transmissions are cellular transmissions using a licensed radio-frequency band.

9. The system of claim 1, wherein all of the transmissions utilize a same radio-frequency channel, wherein said utilization is facilitated by at least the first sequence of periods and the second sequence of periods being non-overlapping.

10. The system of claim 1, wherein the uplink and/or downlink beams are associated with an antenna gain of at least 5 dBi, therefore increasing a system gain associated with the various transmissions.

11. The system of claim 10, wherein said antenna gain is realized using at least one of: (i) a beam switching, (ii) a phase array, and/or (iii) a butler matrix.

12. The system of claim 10, wherein said antenna gain is operative to facilitate simultaneous reception of the downlink transmissions and the uplink transmissions at the second communication node.

13. The system of claim 1, wherein each of the multi-beam subsystems comprises at least two radio-frequency power amplifiers, thereby facilitating simultaneous transmission of the downlink packets and the uplink packets.

14. The system of claim 1, wherein each of the multi-beam subsystems comprises at least two radio-frequency low-noise amplifiers, thereby facilitating simultaneous reception of the downlink packets and the uplink packets.

15. The system of claim 1, wherein the downlink packets are transmitted via an access-point associated with each of the communication nodes.

16. The system of claim 15, wherein the uplink packets are transmitted via a client-side station associated with each of the communication nodes.

17. The system of claim 1, wherein the system operates at microwave frequencies of between 700 MHz and 6 GHz.

18. The system of claim 1, wherein the system operates at millimeter-wave frequencies of between 6 GHz and 300 GHz, in which the uplink and/or downlink beams are associated with an antenna gain of at least 20 dBi, therefore increasing a system gain associated with the various transmissions.

19. A method for synchronizing communication among a plurality of inter-connected communication nodes constituting a wireless backhaul network, comprising:

transmitting, during a first period, and simultaneously using at least two transmitters: (i) a first downlink packet from a first node to a second node via a respective beam, and (ii) a first uplink packet from a third node to the second node via a respective beam;

receiving and decoding, during the first period, and simultaneously using at least two receivers: (i) the first downlink packet in the second node via a respective first beam, and (ii) the first uplink packet in the second node via a respective second beam;

transmitting, during a second period, and simultaneously using at least two additional transmitters: (i) the first downlink packet from the second node to the third node via the respective second beam, and (ii) the first uplink packet from the second node to the first node via the respective first beam;

receiving and decoding, during the second period, and simultaneously: (i) the first uplink packet in the first node via the respective beam, and (ii) the first downlink packet in the third node via the respective beam; and repeating said transmissions and receptions in conjunction with next uplink and downlink packets and further in conjunction with a third period and a fourth period.

20. The method of claim 19, wherein the wireless backhaul includes additional nodes and is associated with a network topology comprising at least one of (i) a mesh, (ii) a deep tree, (iii) a star, and/or (iv) a line.

* * * * *